(12) United States Patent
Wang et al.

(10) Patent No.: US 7,391,381 B2
(45) Date of Patent: Jun. 24, 2008

(54) VEHICLE MOUNTED SATELLITE ANTENNA SYSTEM WITH IN-MOTION TRACKING USING BEAM FORMING

(75) Inventors: James June-Ming Wang, San Marino, CA (US); Chau Chin Yang, Los Angeles, CA (US); Franklin Xiaotian Liu, Palmdale, CA (US); Youren Chen, Pasadena, CA (US); Wenzhang Wang, Arcadia, CA (US)

(73) Assignee: Motia, San Mateo, CA (US)

( * ) Notice: Subject to any disclaimer, the term of this patent is extended or adjusted under 35 U.S.C. 154(b) by 0 days.

(21) Appl. No.: 10/752,794

(22) Filed: Jan. 7, 2004

(65) Prior Publication Data

US 2005/0146476 A1    Jul. 7, 2005

(51) Int. Cl.
*H01Q 1/32* (2006.01)
*H01Q 13/10* (2006.01)
(52) U.S. Cl. .................... 343/713; 343/771; 342/375
(58) Field of Classification Search ................ 343/711, 343/713, 771, 770, 853; 342/359, 372, 375
See application file for complete search history.

(56) References Cited

U.S. PATENT DOCUMENTS

| 3,503,073 | A |   | 3/1970  | Ajioka .................... 343/771 |
| 3,987,454 | A | * | 10/1976 | Epis ....................... 343/771 |
| 5,398,035 | A |   | 3/1995  | Densmore et al. ........... 343/713 |
| 5,579,019 | A | * | 11/1996 | Uematsu et al. ............. 343/771 |

(Continued)

OTHER PUBLICATIONS

Peshlov. V et al., Sky Gate BF, IEEE 2003, Phased-array antenna conference.

K. Sakakibara et al., IEEE Transaction of Vehicular Technology, Jan. 1999.

*Primary Examiner*—Tan Ho
(74) *Attorney, Agent, or Firm*—Patentry

(57) ABSTRACT

The present invention relates to a vehicle mountable satellite antenna as defined in the claims which is operable while the vehicle is in motion. The satellite antenna of the present invention can be installed on top of (or embedded into) the roof of a vehicle. The antenna is capable of providing high gain and a narrow antenna beam for aiming at a satellite direction and enabling broadband communication to vehicle. The present invention provides a vehicle mounted satellite antenna which has low axial ratio, high efficiency and has low grating lobes gain. The vehicle mounted satellite antenna of the present invention provides two simultaneous polarization states. In one embodiment, a hybrid mechanic and electronic steering approach provides a more reasonable cost and performance trade-off. The antenna aiming in the elevation direction is achieved via control of an electronic beamforming network. The antenna is mounted on a rotatable platform under mechanical steering and motion control for aiming the antenna in the azimuth direction. Such approach significantly reduces the complexity and increases the reliability of the mechanical design. The antenna height is compatible to the two-dimensional electronic steering phased-array antenna. Additionally, the number of the electronic processing elements required is considerably reduced from that of the conventional two-dimensional electronic steering phased-array antenna, thereby allowing for low cost and large volume commercial production. The present invention provides electronically generated left, right, up, and down beams for focusing the antenna beam toward the satellite while the vehicle is moving. All of the beams are simultaneously available for use in the motion beam tracking. This provides much faster response and less signal degradation.

47 Claims, 16 Drawing Sheets

RADIATING SURFACE AND WAVEGUIDE BODY DECOMPOSITION

U.S. PATENT DOCUMENTS

| | | | |
|---|---|---|---|
| 5,961,092 A | 10/1999 | Coffield | 248/539 |
| 5,982,333 A | 11/1999 | Stillinger et al. | 343/766 |
| 6,028,562 A | 2/2000 | Guler et al. | 343/771 |
| 6,049,306 A | 4/2000 | Amarillas | 342/359 |
| 6,124,832 A * | 9/2000 | Jeon et al. | 343/711 |
| 6,127,985 A | 10/2000 | Guler | 343/771 |
| 6,191,734 B1 * | 2/2001 | Park et al. | 342/359 |
| 6,201,507 B1 * | 3/2001 | Park et al. | 343/771 |
| 6,545,647 B1 * | 4/2003 | Sievenpiper et al. | 343/795 |
| 6,653,981 B2 * | 11/2003 | Wang et al. | 343/713 |
| 6,657,589 B2 * | 12/2003 | Wang et al. | 342/383 |
| 6,861,996 B2 * | 3/2005 | Jeong | 343/770 |
| 2003/0080898 A1 | 5/2003 | Wang et al. | 342/359 |
| 2003/0080907 A1 | 5/2003 | Wang et al. | 342/713 |
| 2003/0083063 A1 | 5/2003 | Wang et al. | 455/427 |

* cited by examiner

RADIATING SURFACE AND WAVEGUIDE BODY DECOMPOSITION

RIDGE WAVEGUIDE DETAILS

INVERTED L SHAPE WAVEGUIDE DETAILS

INVERTED L SHAPE WAVEGUIDE BODY AND RADIATING SURFACE DETAILS

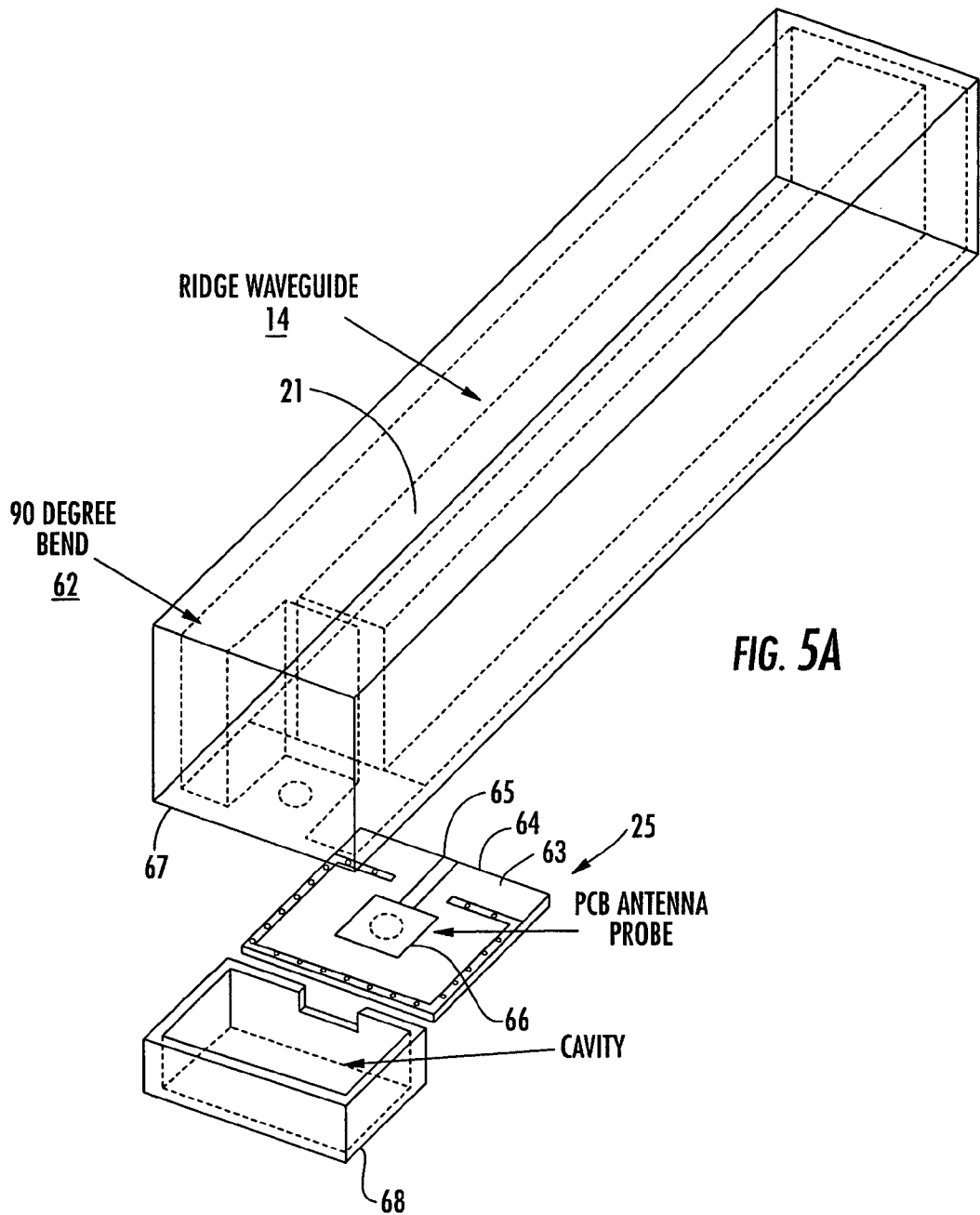

RIDGE WAVEGUIDE BEND AND PROBE DETAILS.

INVERTED L SHAPE WAVEGUIDE BEND AND PROBE DETAILS

INVERTED L SHAPE BEND AND PROBE DECOMPOSITION DETAILS

VEHICLE MOUNTED SATELLITE ANTENNA SYSTEM WITH IN-MOTION TRACKING USING BEAM FORMING

BACKGROUND OF THE INVENTION

1. Field of the Invention

The invention relates to vehicle mounted satellite antennae. More particularly, the invention relates to a slotted waveguide planar vehicle mounted satellite antenna with simultaneous dual polarization states, which can employ a hybrid electronic and mechanic steering mechanism, and is operable while the vehicle is in motion.

2. Related Art

It has long been known how to mount a satellite antenna (dish) atop a vehicle for purposes of communicating with a geostationary or other type of satellite. The initial applications for mounting a satellite dish on a vehicle were military communication and remote television news broadcasting. Consequently, the first methods of mounting a satellite dish included a telescoping mast which was hingedly coupled to the vehicle. When the vehicle was in motion, the mast would be retracted and folded with the satellite dish lying end up on the roof or a side wall of the vehicle. The dish would be deployed only when the vehicle was stationary. Such a deployable vehicle mounted satellite dish is disclosed in U.S. Pat. No. 5,961,092 to Coffield. Until recently, no vehicle mounted satellite antennae were operable while the vehicle was in motion. The relatively large size of a conventional satellite dish antenna presents significant wind resistance if deployed on a vehicle in motion. This wind resistance adversely affects the operation of the vehicle and subjects the satellite dish to potential wind damage. Moreover, satellite dishes must be accurately aimed at a satellite within a relatively narrow aperture or "look window". In order to operate a satellite dish mounted on a vehicle in motion, it would be necessary to constantly re-aim the dish in order to maintain communication with the satellite.

Recently, satellite antennae have been developed which may be deployed on a vehicle and operated while the vehicle is in motion. Such antennae are disclosed in U.S. Pat. No. 5,398,035 to Densmore et al., U.S. Pat. No. 5,982,333 to Stillinger, and U.S. Pat. No. 6,049,306 to Amarillas. These antenna systems generally include a satellite antenna of reduced size and a solenoid system for aiming the antenna. The solenoid system is coupled to a feedback system and/or vehicle motion detectors in order to automatically re-aim the antenna as the vehicle is in motion. In order to reduce aerodynamic drag and protect the antenna from wind damage, an aerodynamic radome is often used to cover the antenna.

Vehicle mounted satellite antennae which are operable while the vehicle is in motion, can provide one-way or two-way satellite communications. Some applications for such antennae include satellite television reception, telephony in remote locations where cellular telephone service is unavailable, and broadband data communications. The application of television reception may be advantageously applied in common carrier transportation such as long distance buses, in recreational vehicles including boats, and in the rear seats of family mini-vans. The application of remote telephony may be applied in the same situations as well as in various other governmental and commercial settings. The application of broadband data communication may also be applied in many personal, commercial, and governmental settings.

Broadband satellite communication, such as television reception or broadband data communication requires a high gain antenna with high cross-polarization isolation and low signal sidelobes. Satellite antenna gain is proportional to the aperture area of the reflector. Stationary satellite antennae typically utilize a circular parabolic reflector. Reflector type of satellite antennae designed for use on a moving vehicle is difficult to achieve low profile. In order to maintain gain, these low profile antenna are short but wide so that the overall aperture area is kept high. However, this design strategy only works to a point. When the width to height ratio exceeds a certain value such as 2, the efficiency of the antenna is adversely affected. The presently available vehicle mountable dish reflector type of satellite antennas, for commercial and personal use, are no shorter than approximately fifteen inches in height. A mobile satellite antenna produced by Audivox Corp. (MVSTS Satellite TV System) provides four circular Casegrain dish reflector antennas positioned along a horizontal axis perpendicular to the direction of antenna aiming. The signals received by the four dish reflectors are combined in phase to achieve aggregate antenna gain. Since the signal arriving at the phase centers of the four reflectors with the same propagation delay, no phase shifters are required for this mobile satellite antenna. The use of four reflector dishes allow the width to height ratio to be stretched further, while maintaining the antenna efficiency. The overall height of this antenna including radome is approximately 9.5 inches, considerably reduced from the single reflector type of dish antenna. Another mobile satellite antenna produced by Titan corporation (DBS-2400 Low Profile Ku-Band Antenna System) uses four hemisphere Luneberg lens antennas positioned on top of a ground plate along a horizontal axis perpendicular to the direction of the antenna aiming. The signals received by four Luneberg lens antennas are combined. The use of the ground plate to create an image of the hemisphere antenna reduces the height of the Luneberg lens by half, to approximately 5 inches (including radom). Another approach described in U.S. Pat. Nos. 6,657,589 and 6,653,981 to Wang et al., is a linear cylindrical Casegrain reflector antenna with line source. Such antenna profile is also limited to approximately 5 inches without elongating the antenna length prohibitively. A common drawback of the antennas described above is that two dimensional mechanic movement and control is required to aim the antenna toward satellite. This makes the mechanic design complicated and reduces the reliability of the antenna system. Another drawback of these types of antennas is that the height of the antenna is still too large for esthetically mounting on top of the roof of the commercial vehicles such as mini-van or SUV (Suburban Utility Vehicle). Further, the Lunberg lens antenna approach is heavy and expensive.

Another approach for implementing the mobile satellite antenna is to employ a phased array antenna having a large number of antenna elements. An antenna aiming in the azimuth and elevation directions is achieved by passing the received signal from each antenna element through a phase shifter. The phase shifter rotates the phases of the signals received from all antenna elements to a common phase before they are combined. While such antennas can be implemented with a very low profile, the large number of microwave processing elements such as amplifiers and phase shifters used in the electronic beam forming network results in high implementation cost, preventing mass volume commercial use. One of such antenna was published by V. Peshlov et al. of Sky Gate. BG, IEEE 2003, Phased-array antenna conference.

U.S. Patent Application Nos. 2003/0083063, 2003/0080907 and 2003/0080898 describe an antenna mounted on a horizontal platform, which is rotatable to adjust the antenna beam in the azimuth direction driven by a motor, and is also capable of steering the antenna beam in the elevation direction through an electronic beam forming network.

Waveguide antennas are typically less than one wavelength in height and provide signal combining along the waveguide longitudinal axis. Many forms of waveguides can be used for microwave energy transmission. Rectangular waveguides have currents flowing on its interior wall and interrupting those currents by cutting through the waveguide wall can cause radiation into the exterior. It is well known, and used, that a radiating aperture is achieved when that aperture is approximately one-half free space wavelength long and one twentieth of a wavelength wide is cut through the broad wall of that waveguide. The aperture is widely described as a "slot" through the waveguide wall. Locating such a slot at various positions on the waveguide wall achieves varying degrees of excitation of microwave fields emanating from the slot. The microwave fields from the simple slot are characterized as being linearly polarized microwave fields.

Many applications for field radiating structures require that the radiated fields have the property of being circularly polarized. A widely used technique for producing a circular polarized radiating element is the cutting of a pair of slots through the broad wall of a rectangular waveguide. The two slots are typically caused to cross each other at ninety degrees to each other, and at the center of each slots length. Further, the crossed slot is normally placed on a line that is parallel to the waveguide axis and is a distance of approximately one quarter of the waveguide width away from the waveguide axis.

U.S. Pat. No. 3,503,073 to James Ajioka et al., and subsequently in IEEE Transaction On Antenna and Propagation, March 1974, describes using a dual polarized slot radiators in bifurcated waveguide arrays. The radiating element is a pair of crossed slots in the narrow wall of a bifurcated rectangular waveguide that couples even and odd modes. One linear polarization is excited by the even mode, and the orthogonal linear polarization is excited by the odd mode. Alternatively, one circular polarization can be excited through one of the pair of waveguides, whereas, the other circular polarization can be excited through another waveguide in the pair. The above-described antenna design approach has the drawback of unequal propagation velocities of the even and odd mode within the waveguide which causes the even and odd beam to point at different direction. In order to equalize the two group velocities, very narrow compensating slits within the waveguide wall are used, which reduces the waveguide bandwidth and significantly complicates the manufacturing complexity.

Another antenna described in IEEE Transaction of Vehicular Technology, January 1999 by K. Sakakibara et al., employs X-shaped slot located in the broadwall of a rectangular waveguide, approximately halfway between the center line and the narrow wall, to form a two-beam slotted leaky waveguide array. The broad side width of rectangular waveguide is approximately half the waveguide, and the cross slot center is offset from the center of the waveguide toward the sidewall by approximately 90 mil. The slot spacing along the waveguide is 0.874 inch. Such waveguide spacing can result in grating lobe when the beam is steered to different elevation angle. At higher elevation angle, the grating lobe becomes comparable in strength to the main lobe, thereby reduces the antenna gain. A right-hand circular polarization can be achieved by feeding the waveguide from one end, whereas a left hand circular polarization can be achieved by feeding the waveguide from the opposite end. One disadvantage of this antenna is that the beam direction of the right-hand polarization antenna is different than the beam direction of the left-hand polarization antenna. As the user switches from one polarization to the other polarization, the antenna rotates in azimuth direction in order to refocus the antenna toward the satellite, resulting in temporary disruption of signal reception. The antenna described above is designed for a fixed elevation beam angle.

U.S. Pat. No. 6,028,562 to Michael et al. describes a planar array of waveguide slot radiators of parallel waveguides which couples the electromagnetic signal from alternating +45 degree and −45 degree radiating slots interfaced on top of the waveguide to the slots on the broadwall of the waveguides via cavities which serve as impedance matching network. In a corresponding U.S. Pat. No. 6,127,985 to Michael et al., a similar slotted waveguide structure is employed. A T-shaped ridge waveguide is employed to realize closely spaced waveguide slot radiator to provide simultaneous dual polarization and suppression of grating lobes. The Michael patents have the disadvantage of complicated manufacturing processing. In addition, the patents use a rear-fed waveguide combining structure, which is not intended for electronic beam steering.

Conventional systems have focused the antenna beam toward the satellite while vehicle is moving using a mechanic dithering approach. In this approach, the antenna is rotated in both azimuth and elevation by a small angle, such as a fraction of the antenna beamwidth, to slightly off-point the antenna beam in the left, right, up, and down directions. The mechanic dithering involves controlling a motor to move the antenna platform. This approach has the shortcoming of a slow response and inaccuracies in the mechanic movement require the use of motion sensors (such as gyro, accelerometer, or compass) to aiding the tracking thereby resulting in significant signal degradation. Electronic dithering is faster, but still subject to the similar problems of slow response. The motion sensors are expensive.

It is desirable to provide a vehicle mounted satellite antenna which has simpler mechanical control and more reliable design.

SUMMARY OF THE INVENTION

The present invention relates to a vehicle mountable satellite antenna as defined in the claims which is operable while the vehicle is in motion. The satellite antenna of the present invention can be installed on top of (or embedded into) the roof of a vehicle. The antenna is capable of providing high gain and a narrow antenna beam for aiming at a satellite direction and enabling broadband communication to vehicle. The present invention provides a vehicle mounted satellite antenna which has low axial ratio, high efficiency and has low grating lobes gain. The vehicle mounted satellite antenna of the present invention provides two simultaneous polarization states.

In one embodiment, the present invention provides a ridged waveguide instead of a conventional rectangular waveguide to alleviate the effects of grating lobes. The ridge waveguide provides a ridged section longitudinally between walls forming the waveguide. A plurality of radiating elements are formed in a radiating surface of the ridged waveguide. The use of a ridged waveguide reduces the width of the waveguide, and thus, the spacing between the antenna slots. This suppresses the strength of the grating lobe. In conventional approaches, the length between cross slots along the waveguide is approximately one waveguide. The resultant beam points upward in the plane orthogonal to the waveguide axis. The present invention reduces the length between cross slots along the waveguide to further suppress the grating lobe.

This results in further beam tilting away from the plane orthogonal to the waveguide axis. However, as long as the beam can be pointed to highest required elevation angle, the beam tilting does not have adverse effects on the overall system performance.

In an alternate embodiment, an inverted L-shaped waveguide has a first wall extending vertically downward from a top surface. The top surface can include a ridge portion. The top surface includes a plurality of radiating elements for forming a radiating surface.

In one embodiment, a hybrid mechanic and electronic steering approach provides a more reasonable cost and performance trade-off. The antenna aiming in the elevation direction is achieved via control of an electronic beamforming network. The antenna is mounted on a rotatable platform under mechanical steering and motion control for aiming the antenna in the azimuth direction. Such approach significantly reduces the complexity and increases the reliability of the mechanical design. The antenna height is compatible to the two-dimensional electronic steering phased-array antenna. Additionally, the number of the electronic processing elements required is considerably reduced from that of the conventional two-dimensional electronic steering phased-array antenna, thereby allowing for low cost and large volume commercial production.

The present invention provides electronically generated left, right, up, and down beams for focusing the antenna beam toward the satellite while the vehicle is moving. All of the beams are simultaneously available for use in the motion beam tracking. This provides much faster response and less signal degradation.

The waveguide couples the EM energy from all radiating elements in the waveguide axis direction and combines the energy together. It has been found that the loss through the waveguide coupling and combining is significantly lower than that using conventional approach utilizing passive microwave processing elements printed on the circuit board at the proposed operating frequency. In addition, the present invention also reduces the number of low noise amplifiers used in the antenna system because only one set of low noise amplifiers for each waveguide is used, as opposed to conventionally use of one set of low noise amplifier for each radiating element.

The ridged waveguide of the present invention produced a more concentrated field line near the center line of the broadwall, thereby reducing the width of the broadwall from a typical value for a conventional rectangular waveguide to about 0.398 inches at an example frequency in the direction of broadcast satellite range of about 12.2 GHz to about 12.7 GHz.

The invention will be more fully described by reference to the following drawings.

BRIEF DESCRIPTION OF THE DRAWINGS

FIG. 5A is a schematic diagram of an embodiment of a waveguide probe for use with the ridged waveguide.

DETAILED DESCRIPTION

Figure 1:
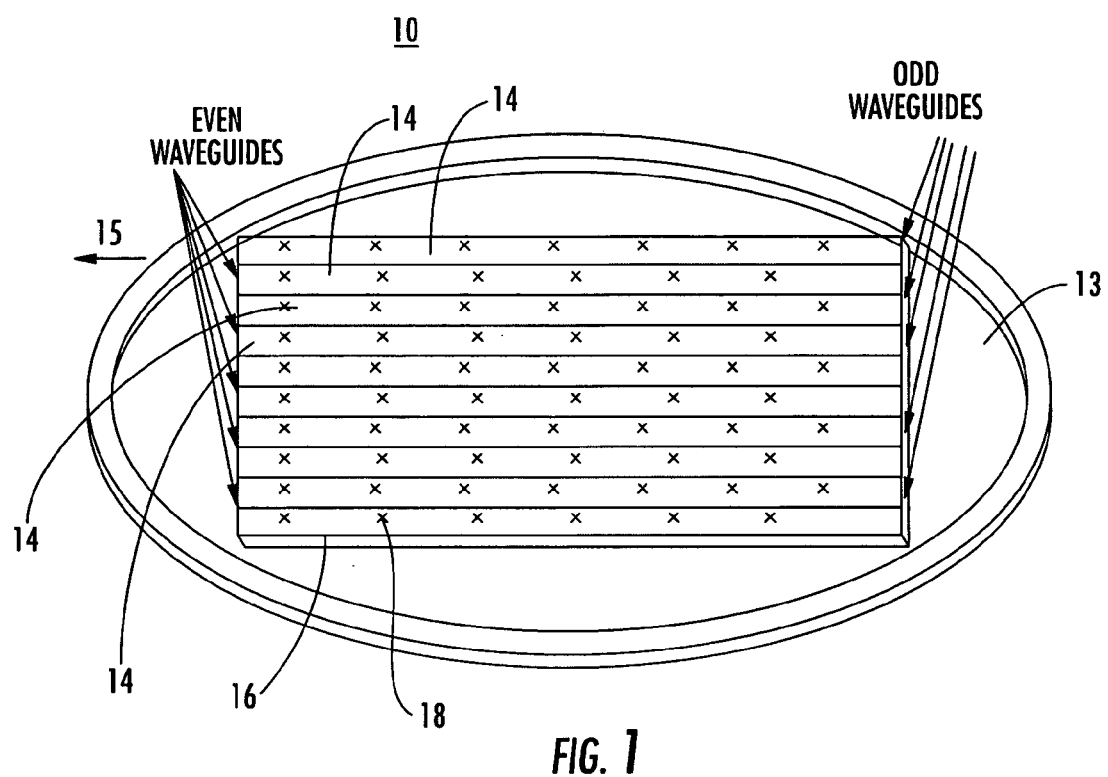
FIG. 1 is a schematic diagram of an antenna system including a mobile platform in accordance with the teachings of the present invention.
Figure 2A:
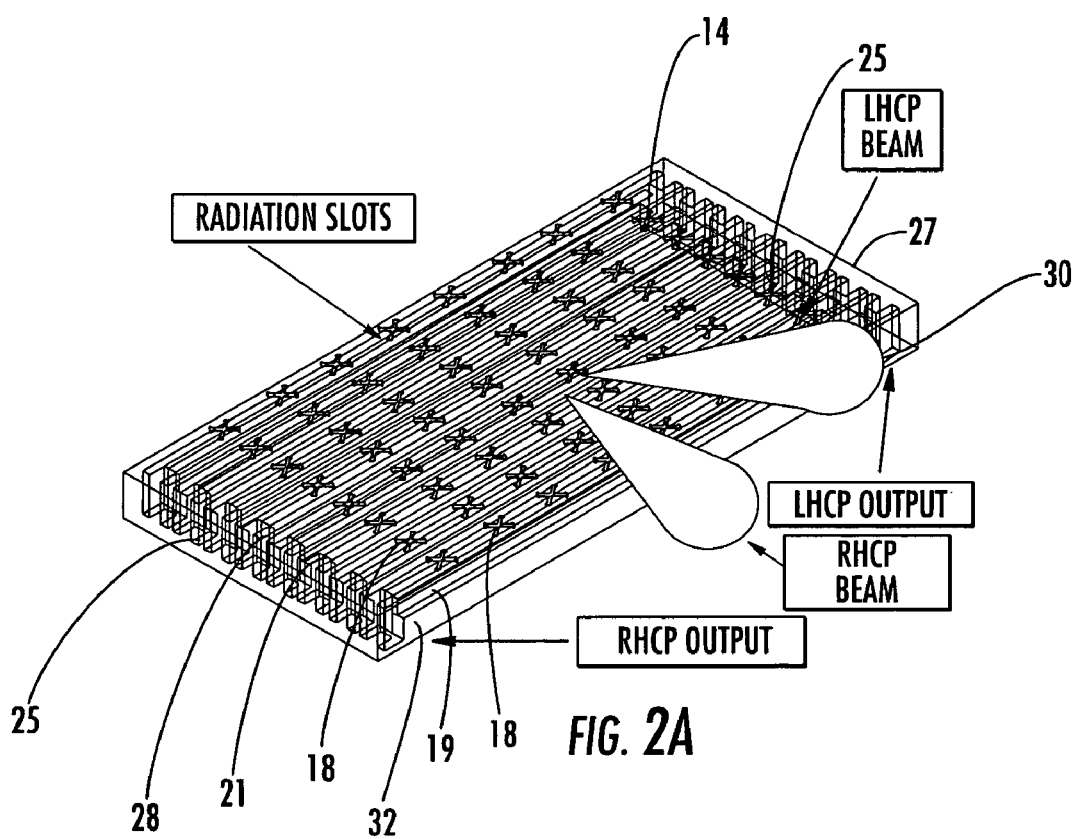
FIG. 2A is a schematic diagram of an embodiment of a waveguide antenna of the present invention.
Figure 2B:
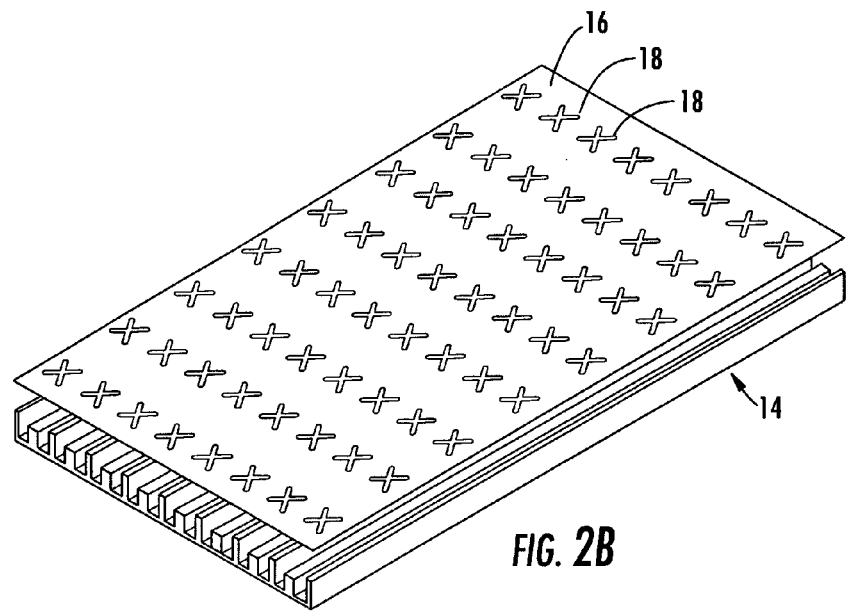
FIG. 2B is a schematic diagram of a waveguide body decomposition of the waveguide shown in FIG. 2A.
Figure 2C:
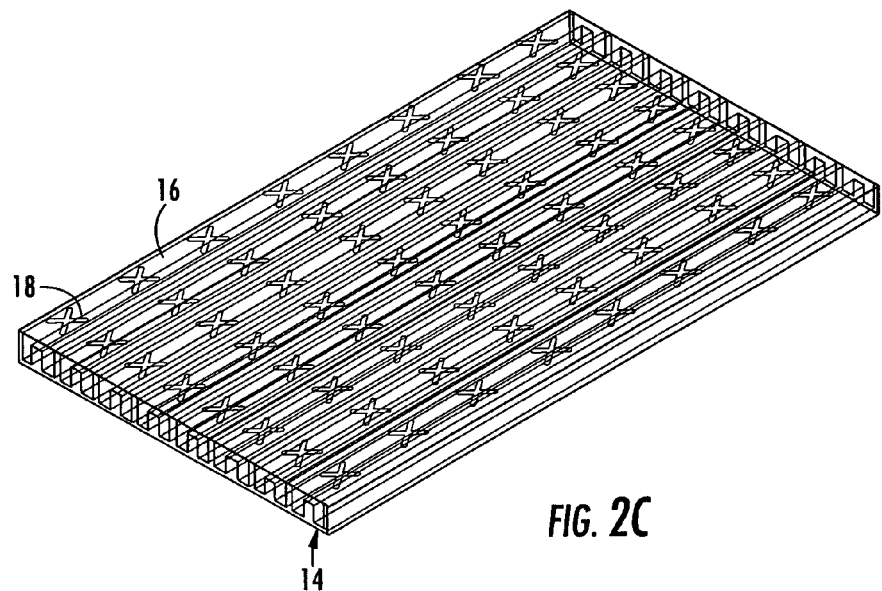
FIG. 2C is a schematic diagram of the waveguide shown in FIG. 2A.
Figure 2D:
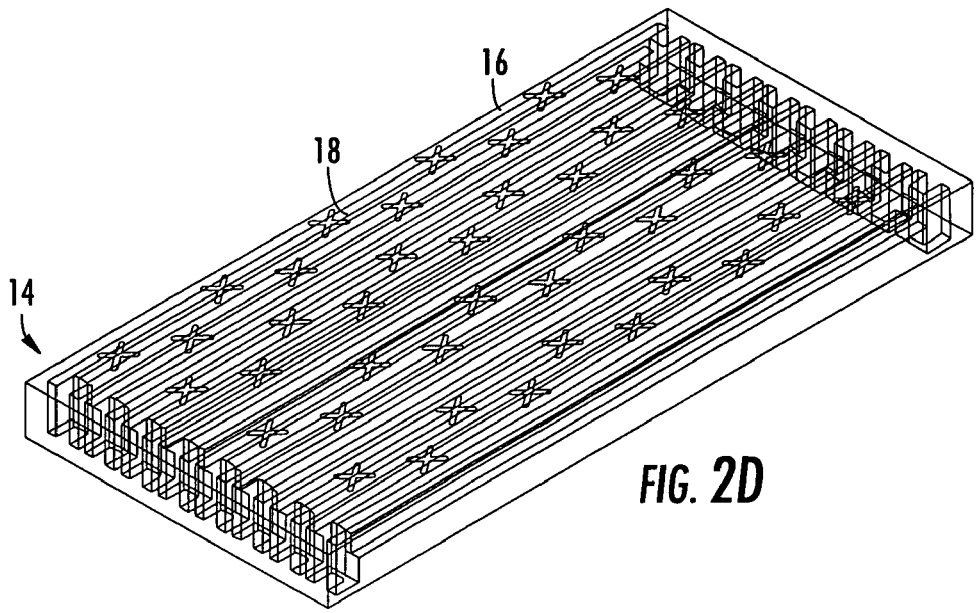
FIG. 2D is an alternate embodiment of the waveguide shown in FIG. 2A.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a schematic diagram of antenna system 10 in accordance with the teachings of the present invention. Waveguide antenna 12 comprises an antenna array formed of a plurality of waveguides 14 positioned parallel to each other on horizontal platform 13. Horizontal platform 13 is rotatable under mechanical steering and motion control for aiming the antenna in the azimuth direction.

Waveguide axis 15 is in a direction perpendicular to the antenna aiming. Radiating surface 16 is the broad side facing the zenith direction. Radiating surface 16 of the waveguide antenna 12 includes a plurality of radiating elements 18 distributed at uniform spacing along waveguide axis 15. Radiating element 18 provides coupling of electromagnetic (EM) energy between waveguide 14 and the free space. For example, radiating elements 18 can be X-shaped cross slots. Waveguide 14 couples the EM energy from all radiating elements 18 in the waveguide axis direction and combines the energy together.

In one embodiment, waveguide 14 is formed of a ridged waveguide, as shown in FIGS. 2A–D and 3. Walls 19 have a narrow width $W_1$. For example, walls 19 can have a width of about 0.08 to about 0.12 inches. Bottom 20 includes width $W_2$ typically wider than width $W_1$. For example, width $W_2$ can be in the range of about 0.450 to about 0.470 inches. Bottom 20 is coupled to bottom portion 22 of walls 19 or bottom 20 can be integral with bottom portion 22 of walls 19. Ridge section 21 is positioned longitudinally between walls 19. For example, ridge section 21 can have a rectangular or square configuration. Ridge section 21 has a height $H_1$ which is smaller than height $H_2$ of walls 19. For example, ridge section can have a height $H_1$ in the range of about 0.18 to about 0.33 inches and walls 19 can have a height $H_2$ in the range of about 0.2 to about 0.35 inches. Radiating surface 16 is coupled or integral with top portion 23 of walls 19. Radiating surface 16 is in the range of about 0.02 inch to about 0.03 inches or about 0.03 inches thick.

Radiating elements 18 can be positioned along the direction of waveguide axis 15 with the phase centers of the cross slots of radiating elements 18 positioned along a straight line along waveguide axis 15 and in between a center line of waveguide ridge section 21 and one of walls 19. In one embodiment, radiating elements 18 can be placed about half a waveguide wavelength apart. For example, the length of radiating elements 18 can be about 0.3 inches to about 0.5 wavelength or about 0.4 inches to about 0.5 inches at an operating frequency of a direct broadcast signal of about 12.2 GHz to about 12.7 GHz. Radiating elements 18 can be spaced, for example, about 0.5 inches to about 1.0 inches or about 0.9 inches apart. Radiating element 18 provides circular polarization at any transverse position. For example, the crossing angle of the two slots of the cross slot of radiating element 18 can be 60 degrees to about 90 degrees. Accordingly, the present invention allows broader freedom in cross slot design thereby providing a modified shape of a three dimensional pattern produced by the cross slot radiating element.

A typical requirement to operate such mobile antenna in the Continental United States (Conus), is that the antenna beam is steered from about 25 degrees to about 65 degrees in elevation. It has been found that in order to achieve high antenna gain and low axial ratio in such an operating range, the antenna gain is optimized toward about 40 degrees to about 45 degrees in elevation. This can be achieved by offsetting radiating element 18 from the center of waveguide axis 15 toward one of walls 19. The gain and axial ratio is optimized by moving the cross slot of radiating element 18 toward wall 19. The offset creates circular polarization and also tilts the antenna beam toward the lower elevation instead of the zenith direction. When the edge of the cross slots of radiating element 18 reaches wall 19, the highest possible elevation with good axial ratio can be achieved is determined. This provides an elevation operating range of about 25 degrees to about 55 degrees.

In one embodiment, one or more waveguides 14 are formed from a metal, such as aluminum stock for forming walls 19 and bottom 20 including ridge portion 21. Radiating surface 16 is also formed of a metal, such as aluminum stock. Radiating surface 16 is attached to waveguides 14 by a dip brazing process or using a series of mounting elements, such as screws, bolts, adhesives, and laser weldments, along walls 19 of waveguide 14 to provide proper electric conductivity along the joint between radiating surface 16 and waveguides 14. It will be appreciated that alternative methods can be used for coupling radiating surface 16 to waveguides 14, 40.

An alternative construction is a metalized-surface plastic construction. Walls 19 and radiating surface 16 can be molded in a top piece of plastic having engaging hooks 24 along bottom portion 22 of walls 19. Bottom 20 of waveguide 14, including ridge section 21, is molded as a second piece of plastic. Both the top and the bottom pieces are metalized, through a metal vapor deposit process or other processes known in the art. The top and bottom pieces can be snapped together through engaging hooks 24, which also inserts pressure in the joint between radiating surface 16 and walls 19 of waveguides 14, to ensure proper conductivity between the two pieces. This embodiment is suitable for low cost, mass production.

An antenna probe 25 is located on ends 27, 28 of the waveguide 14, as shown in FIG. 2. Antenna probe 25 located on end 27 is used to couple a left-hand polarization signal from waveguide 14 to beam forming network 30. Antenna probe 25 located on end 28 is used to couple a right-hand circular polarization signal from waveguide 14 to beam forming network 32. Beam forming networks 30, 32 provide low noise amplification of the signal and apply progressively phase shifts to the signals from different waveguides 14 to compensate for progressive signal propagation delays before the signals from different waveguides 14 are combined. By changing the amount of the progressive phase shift, the beam can be steered to different elevation directions.

Figure 3:
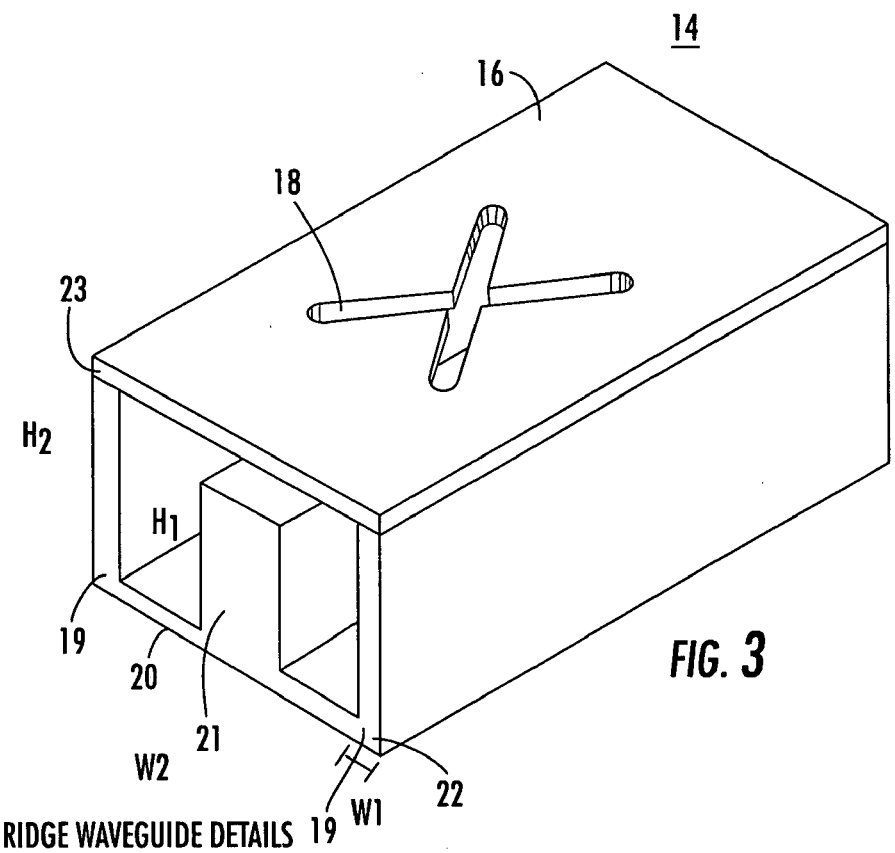
FIG. 3 is a schematic diagram of an embodiment of a ridged waveguide.

FIGS. 4A–B and FIGS. 4D–E illustrate an alternative waveguide structure. Waveguide 40 comprises an inverted "L" shape. Wall 42 extends vertically downward from top surface 44 of waveguide 40. For example, wall 42 can have a height $H_3$ in the range of about 0.3 to about 0.4 inches. The opposite wall 45 extends vertically downward from top surface 44. For example, wall 45 can have a height $H_4$ in the range of about 0.05 to about 0.15 inches. The width of two walls 42 and 45 is in the range of about 0.04 to 0.12 inches. The width $W_4$ of the ridge portion 46 is in the range of about 0.06 to about 1.0 inches. Top surface 44 forms radiating surface 16. A plurality of radiating elements 18 are formed in top surface 44. Radiating elements 18 similar to those described above for waveguide 14 can be used in this embodiment. It will be appreciated that waveguide 40 can be used in all aspects of the present invention such as illustrated in the configuration of FIG. 1, in place of waveguide 14. The ridged waveguide in FIG. 3 is one embodiment of the inverted "L" shape in which $H_3$ is equal to $H_4$.

The width $W_3$ of top surface 44 of the inverted "L" is small compared to the width of a conventional rectangular waveguide for the microwave frequency of interest to allow adjacent slotted waveguides to be close enough to eliminate grating lobes which would otherwise come into real space when the beam is scanned. For example, the width $W_3$ of top surface 44 can be in the range of about 0.4 to about 0.5 inches. Accordingly, waveguide 40 has a nominal internal width of about 0.32 to about 0.42 inches or about 0.35 to 0.40 freespace wavelengths facing the beam direction buried behind the face of waveguide 40. Height $H_3$, $H_4$, and width $W_3$, $W_4$ can be adjusted to slow the phase velocity in waveguide 40. Accordingly, radiating elements 18 can be placed one waveguide wavelength apart and yet be close enough to each other to prevent grating lobes in the unscanned planes. Different variations of the L-shape waveguide 40 can be used to achieve the same radiation characteristics. Depth $D_1$ of ridge portion 46 can be adjusted to reduce the width $W_3$.

Wall 42 as the vertical portion of the inverted "L" functions as a component of the waveguide width, thus enabling wave propagation similar to a conventional rectangular waveguide of a width approximately equal to the sum of wall 42 and top surface 44 of the "L". The electromagnetic fields inside the "L" shaped waveguide 40 have a configuration which is similar to a simple dominant mode $TE_{1,0}$ rectangular waveguide. In FIG. 2, the electric field is forced to be zero by wall 19 on the right side. The currents in that narrow wall are vertical and give rise to a magnetic field (H-field) parallel to the axis of the waveguide. At locations to the left of that narrow, the H-field gradually becomes transverse to waveguide axis. Crossed slots or radiating elements 18 located at the proper position are then excited by the same magnitude of $H_{LONGITUDINAL}$ and $H_{TRANSVERSE}$ and circular polarization is achieved because the two magnetic field components are in time quadrature.

The use of inverted L-shape waveguide 40 allows radiating elements 18 to be more freely positioned on radiating surface 16 of waveguide 40 such that a high elevation beam with good gain and axial ratio can be achieved. The radiating element 18 position can be adjusted by adjusting height $H_3$, $H_4$. In contrast, the achievable antenna property (gain and axial ratio) of the ridged waveguide at high elevation angle can not be moved beyond the edge of the waveguide wall 19, limiting the achievable antenna property at high elevation angle.

In one embodiment, one or more waveguides 40 are formed from a metal, such as aluminum stock for forming walls 42 and walls 45. Radiating surface 16 including top surface 44 is also formed of a metal, such as aluminum stock. Radiating surface 16 is attached to wall 42 and wall 45 by a dip brazing process or using a series of mounting elements, such as screws, bolts, adhesives and (laser) weldments, along radiating surface 16 of waveguide 40 to provide proper electric conductivity along the joint between radiating surface 16 and waveguides 40. It will be appreciated that alternative methods can be used for coupling radiating surface 16 to waveguides 40.

An alternative construction is a metalized-surface plastic construction. Walls 42 can be molded in a top piece of plastic having engaging hooks 46 along top portion 48 of walls 42. Radiating surface 16, including ridge section 45, is molded as a second piece of plastic. Both the top and the bottom pieces are metalized, through a metal vapor deposit process or other processes known in the art. The top and bottom pieces can be snapped together through engaging hooks 46, which also inserts pressure in the joint between radiating surface 16 and wall 42 of waveguides 40, to ensure proper conductivity between the two pieces. This embodiment is suitable for low cost, mass production.

Figure 4A:
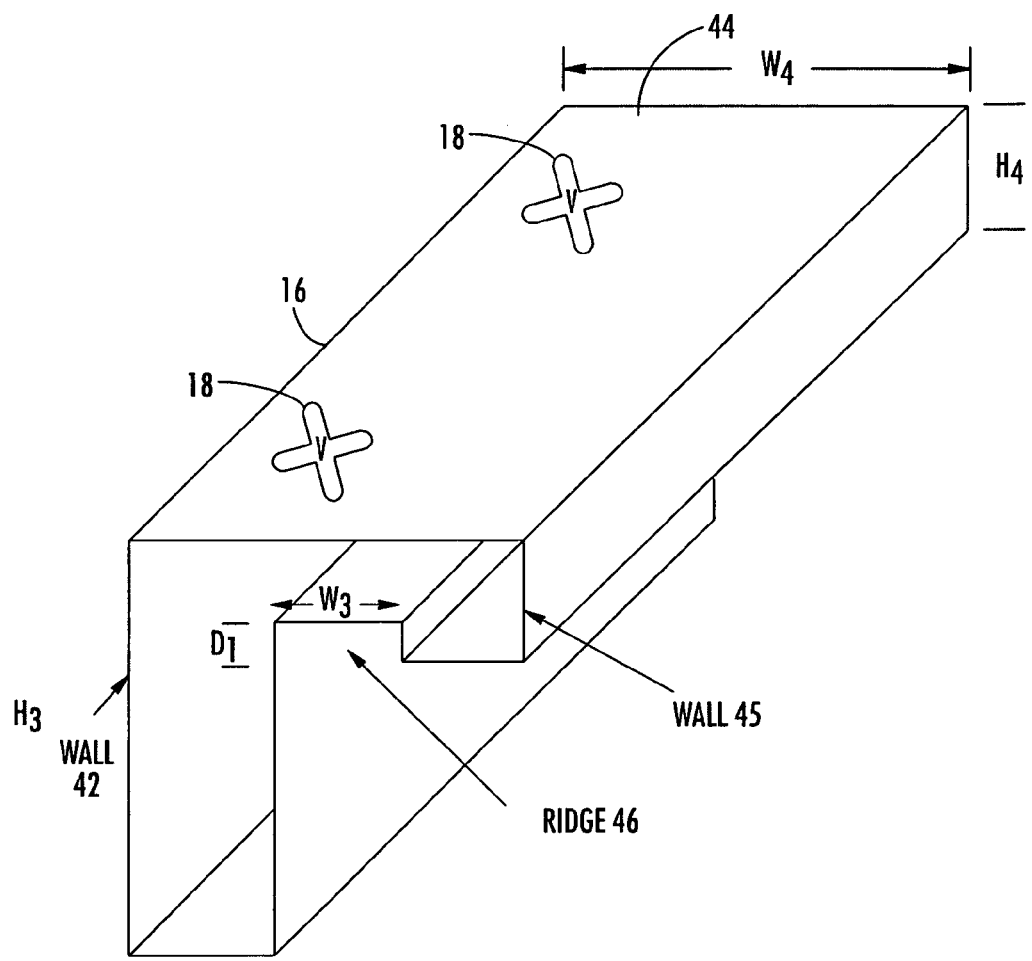
FIG. 4A is a schematic diagram of an embodiment of a L-shaped waveguide.
Figure 4B:
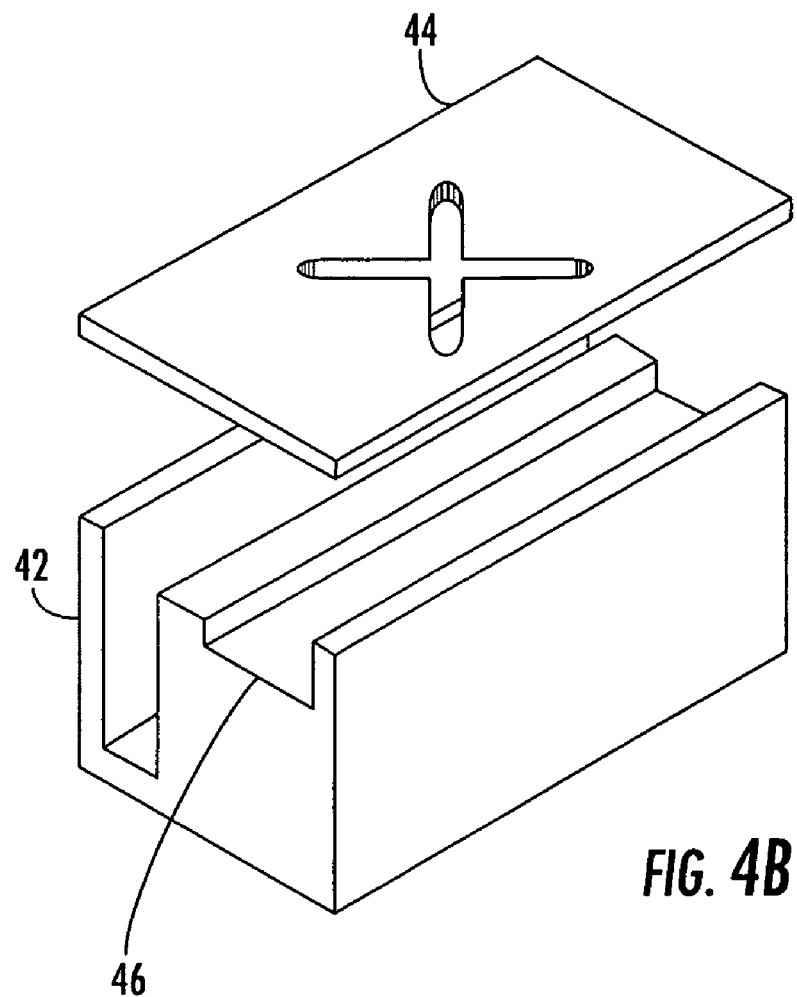
FIG. 4B is a schematic diagram of a waveguide in decomposition of the waveguide shown in FIG. 4A.
Figure 4C:
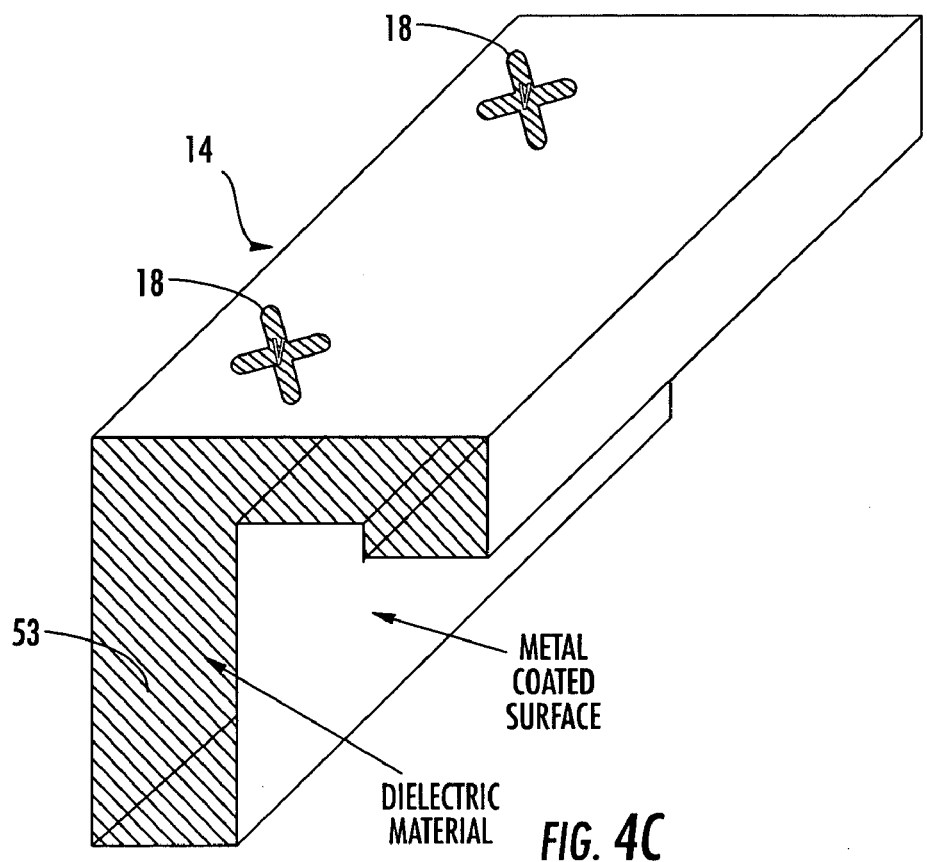
FIG. 4C is schematic diagram of use of a dielectric material with a ridged waveguide.
Figure 4D:
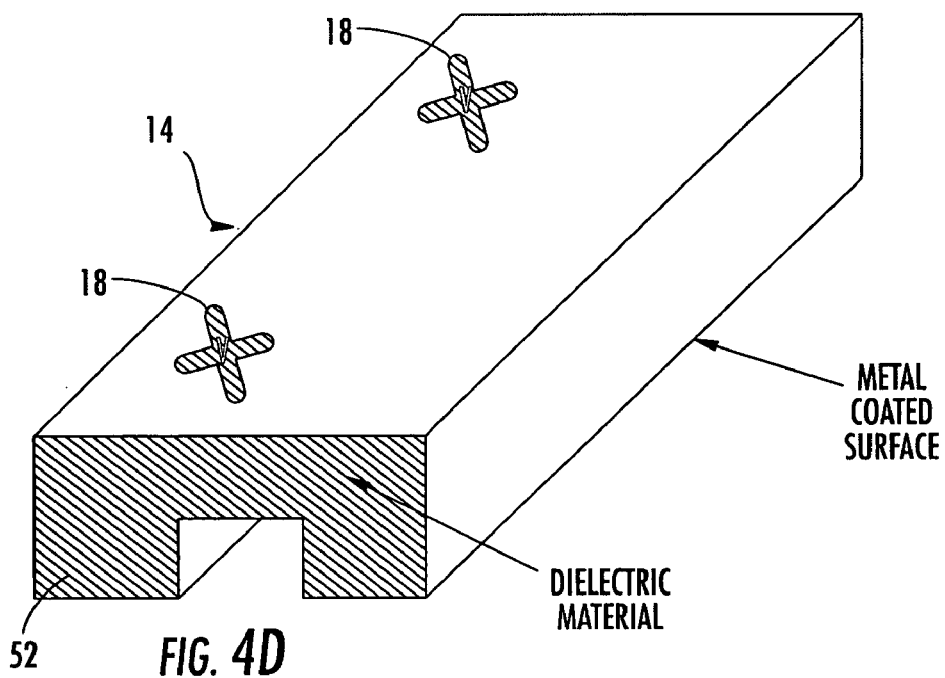
FIG. 4D is a schematic diagram of use of a dielectric material with a L-shaped waveguide.
Figure 4E:
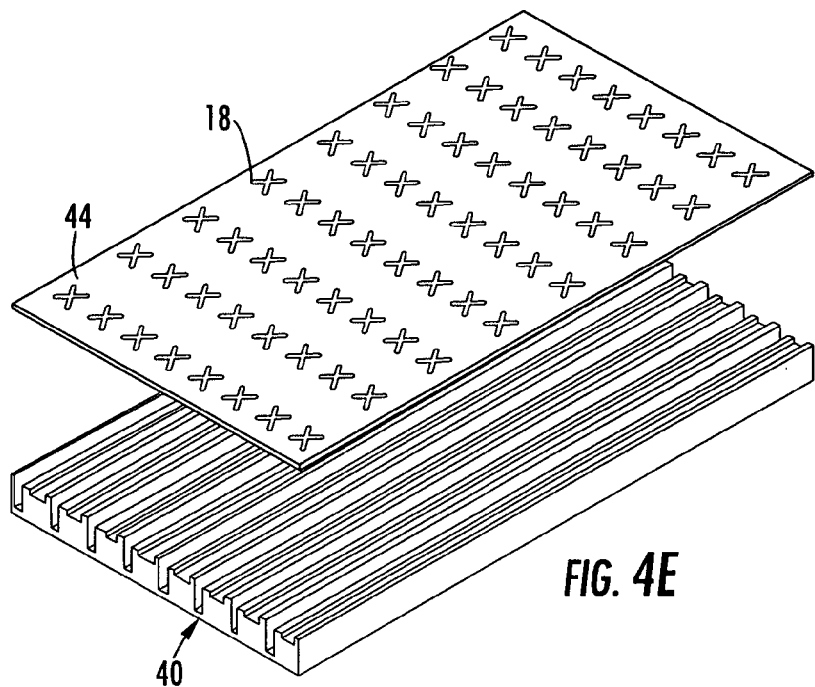
FIG. 4E is a schematic diagram of a waveguide antenna including the waveguide of FIG. 4A.
Figure 4F:
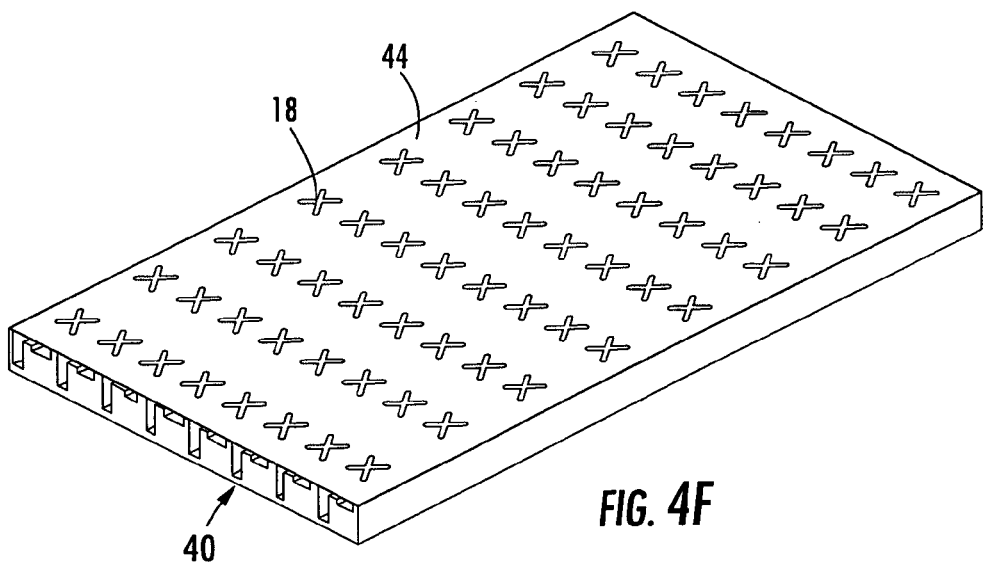
FIG. 4F is a schematic diagram of a waveguide antenna in decomposition including the waveguide of FIG. 4A.

Another approach to achieve high gain, low grating lobe, and good axial ratio is to employ low loss dielectric-loaded waveguide as shown in FIG. 4C and FIG. 4D. The dielectric-loaded waveguide employs a low loss dielectric material to fill in the entire interior 52 of the waveguides 14, as shown in FIG. 4C. A dielectric material can be used to fill interior 53 of waveguide 40, as shown in FIG. 4D. All waveguide walls and radiating surface are formed by metal coating the dielectric material 14. The cross-slot radiating elements 18 on the top radiating surface should be left uncoated such that the dielectric material is exposed to air in that portion. The gap between two adjacent waveguide should also be filled with metal or other conducting material. The wavelength within the dielectric material is inversely proportional to the square of the dielectric constant of the dielectric material. The use of dielectric material allows the wavelength within the waveguide to be significantly reduced, thereby suppressing the grating lobes and increasing the antenna gain. A suitable dietectric material 50 is C-Stock from Cuming Microwave and Eccostock HT003 from Emerson Cuming.

Figure 5B:
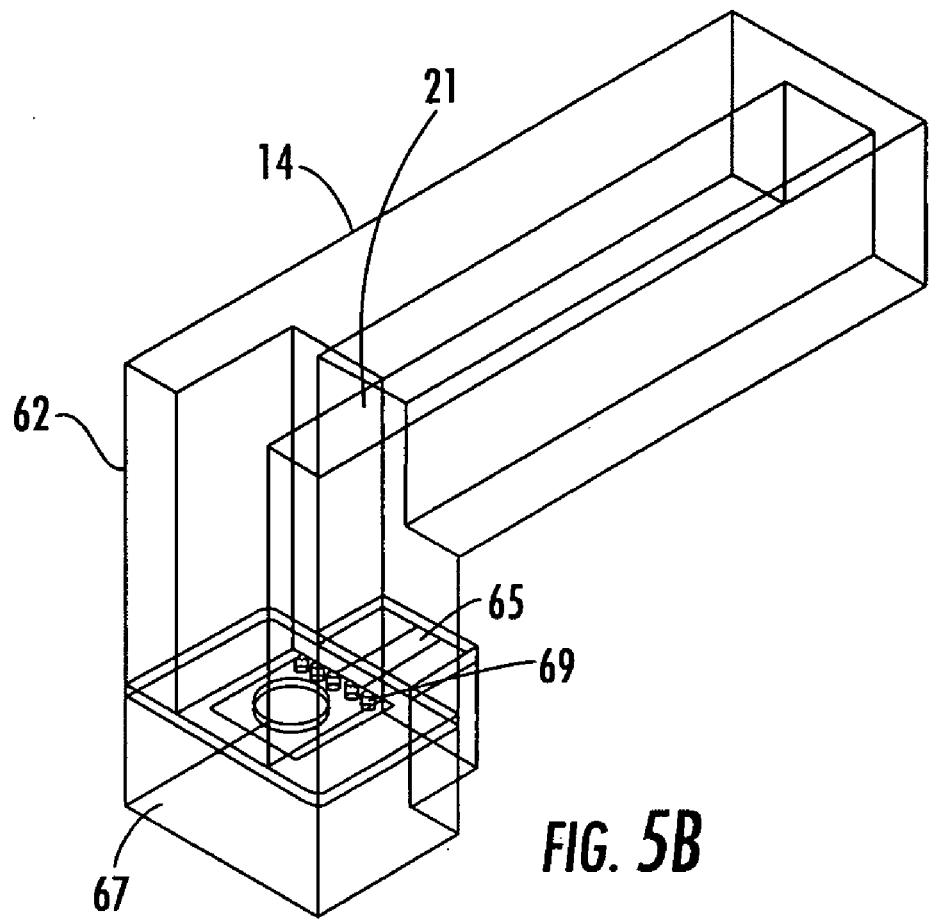
FIG. 5B is a schematic diagram of an embodiment of a waveguide probe assembled for use with the ridged waveguide.

Referring to FIGS. 5A–B, an embodiment of antenna probe 25 is shown. Antenna probe 25 is used for coupling electromagnetic energy between waveguide 14 and an active beam forming circuit board. Waveguide 14 includes waveguide bend 62 to rotate the feed end of waveguide 14 downward. For example, waveguide bend 62 can be about 90 degrees. Waveguide bend 62 also reverses the orientation of ridge section 21 within waveguide 14. Antenna probe 25 is printed onto surface 63 of beam forming network printed circuit board 64. For example, beam forming network printed circuit board 64 can be a two layered printed circuit board (PCB). Antenna probe 25 is formed as an extension of the microstrip 65. Antenna probe 25 can have a termination 66 having a larger dimension than microstrip 65. For example, termination 66 can be rectangular. Termination 66 is attached by microstrip 65 to ridge section 21 at lower end 67 of waveguide bend 62. Cavity 68 under antenna probe 25 terminates waveguide bend 62. For example, cavity 68 can have a depth of about a quarter wavelength. Through holes 69 connect to microstrip 65.

Corresponding to the position of waveguide wall 19, a grounded strip, such as formed of copper, containing a series of ground vias (not shown) forms the continuation of the waveguide wall 19. An active low noise amplifier can follow antenna probe 25 on microwave beam forming network printed circuit board 64 to amplify the signal. The probe shown in FIG. 5 has been analyzed using the Ansoft's EM simulation CAD tool called High Frequency Structure Simulator HFSS. It was demonstrated that less than about 0.2 dB loss can be achieved using this probe implementation. Antenna probe 25 has low loss and is easy to manufacture. The employment of the 90 degree bend allows the antenna probe to be realized as part of the PCB. Accordingly, no additional attachment mechanism is required. This is advantageous to the ease of manufacturing and reliable performance.

Figure 6A:
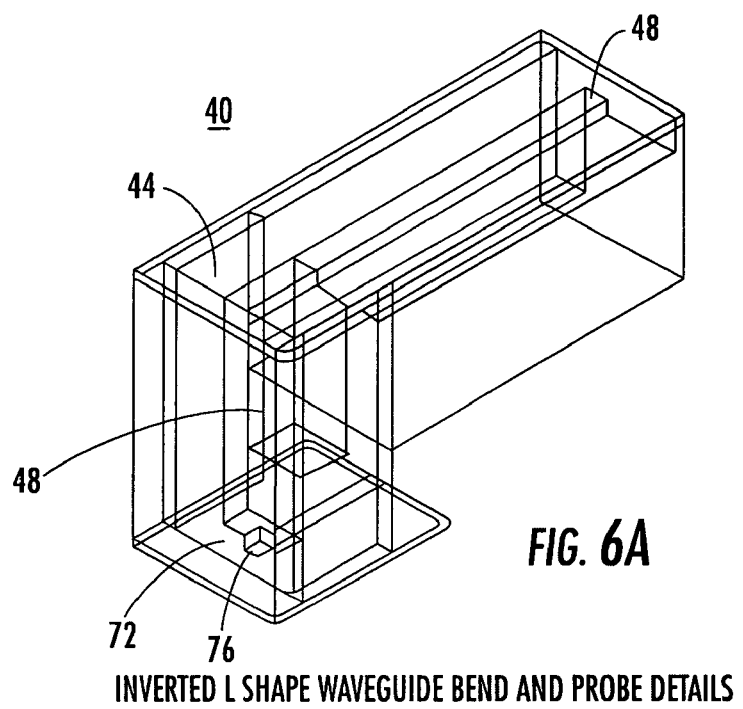
FIG. 6A is a schematic diagram of an embodiment of a waveguide probe for use with the inverted L-shaped waveguide.
Figure 6B:
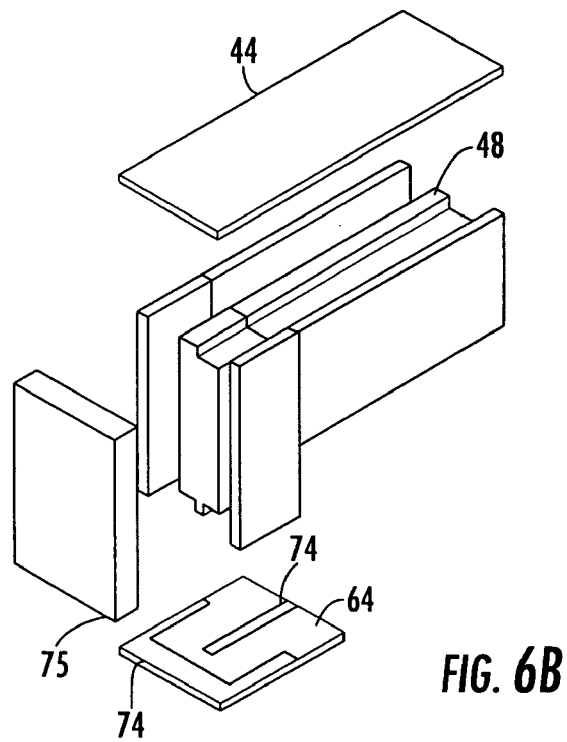
FIG. 6B is a decomposition of the inverted L-shaped bend and probe.

FIGS. 6A–B illustrate an embodiment of an antenna probe which can be used with the inverted L-shaped waveguide. Waveguide 40 includes waveguide bend 72 to bring top surface 44 and ridged portion 48 of waveguide 40 downward and to a microstrip line transition. Waveguide bend 72 also converts the inverted L-shaped ridge waveguide to a symmetric ridge waveguide. For example, bend 72 can be about 90 degrees. Antenna probe 25 comprises microstrip portion 74 printed onto one side of a microwave beam forming network printed circuit board 64. Waveguide 40 is press fit onto the microstrip portion 74 through a section of conducting block 75 and termination 76 to form the waveguide to microstrip line transition. For example, termination 76 can be rectangular or square 42. Wall 19 is connected to the ground plane of the microstrip portion 74 through via holes 77 show in FIG. 6. The ground plane at the bottom of the PCB 64 terminates the waveguide. The probe implementation shown in FIG. 6 has been analyzed by using the Ansoft's EM simulation CAD tool called High Frequency Structure Simulator HFSS. It was demonstrated that less than about 0.2 dB loss can be achieved using this probe implementation. This antenna probe waveguide termination design offers the same advantages of ease of manufacturing, low loss, and reliable performance as that in FIG. 5.

Figure 7:
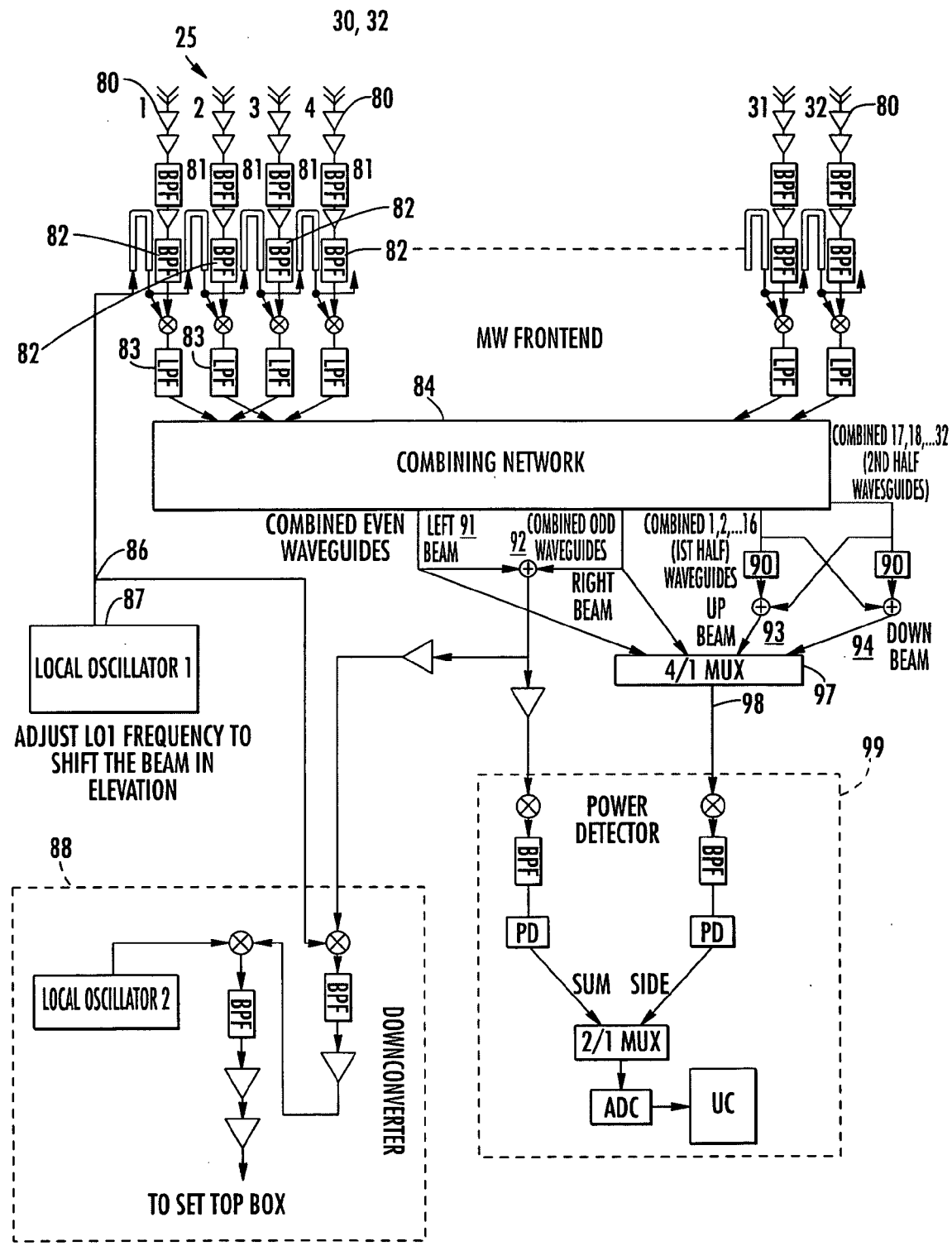
FIG. 7 is a schematic diagram of an embodiment of a beam forming network.

An embodiment antenna beam forming networks 30, 32 is shown in FIG. 7. Beam forming networks 30, 32 comprises antenna probe 25, low noise amplifier 80, bandpass filters 81, 82, downconverter 88, phase shift elements 86, 87, and combiners 84. Low noise amplifier 80 amplifies the received signal and bandpass filters 81, 82 remove the adjacent band interference and noise for each waveguide 14, 40 which is passed to LPF 83. Combining network 84 combines the signal from all waveguides 14, 40 after the phase of the received signals from each waveguide 14 is adjusted by phase shift elements such that the signals are combined in phase. Series delay lines 86 feed local oscillator (LO) signal 87 into downconverters 88. Series delay lines 86 can be used to generate a progressive phase shift in the local oscillator signal used in the downconverter 88 for each waveguide signal such that the signals at the output of the downconverters 88 are in phase, as described in U.S. patent application Ser. No. 10/287,370 and application Ser. No. 10/287,371, hereby incorporated in their entirety by reference into this application. Accordingly, combiners 84 add up all the signals in phase. This is the received signal which is passed to the receiver demodulator. By changing the LO frequency, different amounts of progressive phase shifts are generated, allowing the beam forming networks 30, 32 to steer the antenna beam to different elevation directions. Once the beam is formed, the signal is passed to frequency translator 89 to convert the signal to the desired output frequency.

To facilitate the in-motion pointing of the antenna beam toward a satellite, the present invention provides four additional antenna beams, such as left/right and up/down beams. Left beam 91 and right beam 92 are created by using different cross slot spacing along even and odd numbers of waveguides 14, shown in FIG. 1. Wider spacing allows one beam to tilt less than the other beam using the narrower slot spacing or pitch, as shown in FIG. 1. Combining an odd waveguide 14 in adaptive beam forming module 90*a* creates left beam 91 and combining an even waveguide 14 in module 90*b* creates right beam 92 or vise versa depending on if a wider or narrower slot spacing is used on an odd or even waveguide, as shown in FIG. 7.

Figure 9A:
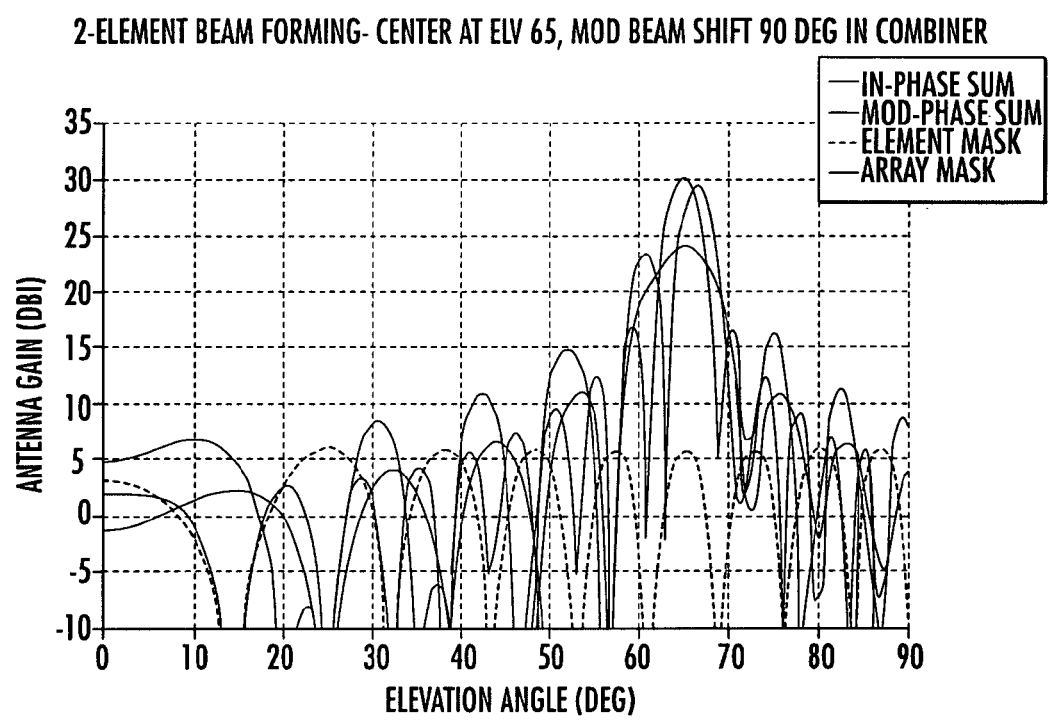
FIG. 9A is a graph of an inferometer antenna pattern of the up and down beams at a center elevation angle at 65 degrees.
Figure 9B:
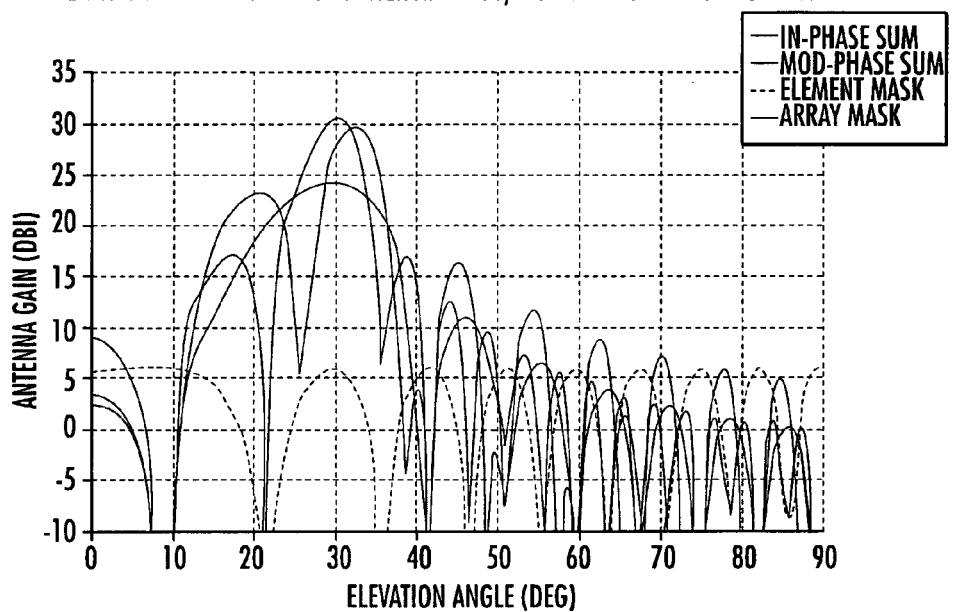
FIG. 9B is a graph of an inferometer antenna pattern of the up and down beams at a center elevation angle at 35 degrees.

Referring to FIG. 7, the phase center of the beam created by the first half of waveguides 14 is at a significantly larger distance (multiple waveguide width) from the phase center of the beam created by the second half group of waveguides 14. The distance between the phase centers allow the interferometer antenna pattern as shown in FIGS. 9A–9B to be created. As shown in FIG. 7, the combining network provides two outputs which sums up the signals from first half (1, 2, . . . 16) of the waveguides and those from the second half (17, 18, . . . 32) of the waveguides. Up beam 93 is formed by combining a 90 degree phase shifted of the first half of waveguides 14 and a second half of waveguides 14. Down beam 94 is formed by the combining the first half of waveguides 14 and the 90 degree phase shifted of the second half of waveguides 14.

In FIG. 9A, the up beam pattern and the SUM beam pattern are shown. The SUM beam pattern points to a 65 degree elevation angle in FIG. 9A and the up beam points to slightly higher elevation angle by approximately 2 degrees. In FIG. 9B, the SUM beam points to a 30 degree elevation angle and the up beam points to approximately 33 degrees. Similar pattern for down beam can be generated with down beam points approximately 2 to 3 degrees below the SUM beam. In the preferred embodiment, the 90 degree phase shifter is used to generate the up and down beam for ease of implementation. Alternatively, phase shifters with other angles can be used to create similar up and down beams with greater or smaller angle separation from the SUM beam.

Sum beam 98, left beam 91, right beam 92, up beam 94, and down beam 95 in mux 97, are shown in FIG. 7. Satellite in-motion tracking can be accomplished by monitoring the signal powers of left beam 91, right beam 92, up beam 93, and down beam 94 with power detector 99. Left beam 91 and right beam 92 are compared against each other and sum beam 98 to obtain information regarding the antenna pointing error in the azimuth direction. Up beam 93 and down beam 94 are compared against each other and sum beam 98 to obtain information regarding the antenna pointing error in the elevation direction. The azimuth error is used to adjust the azimuth motor to dynamically move antenna platform 13, as shown in FIG. 1, and the elevation error is used to adjust the electronic beam steering networks 30, 32 to move the beam in the elevation direction to focus the beam to the satellite during in-motion tracking of the satellite. Accordingly, the present implementation of the left/right/up/down beams allows the antenna to track the satellite during vehicle motion. The use of the four antenna beams allows the in-motion tracking to respond significantly faster than conventional systems. The antenna in-motion tracking can therefore be accomplished without or with a minimum number of motion sensors, thereby, reducing the overall cost of the system.

Figure 8:
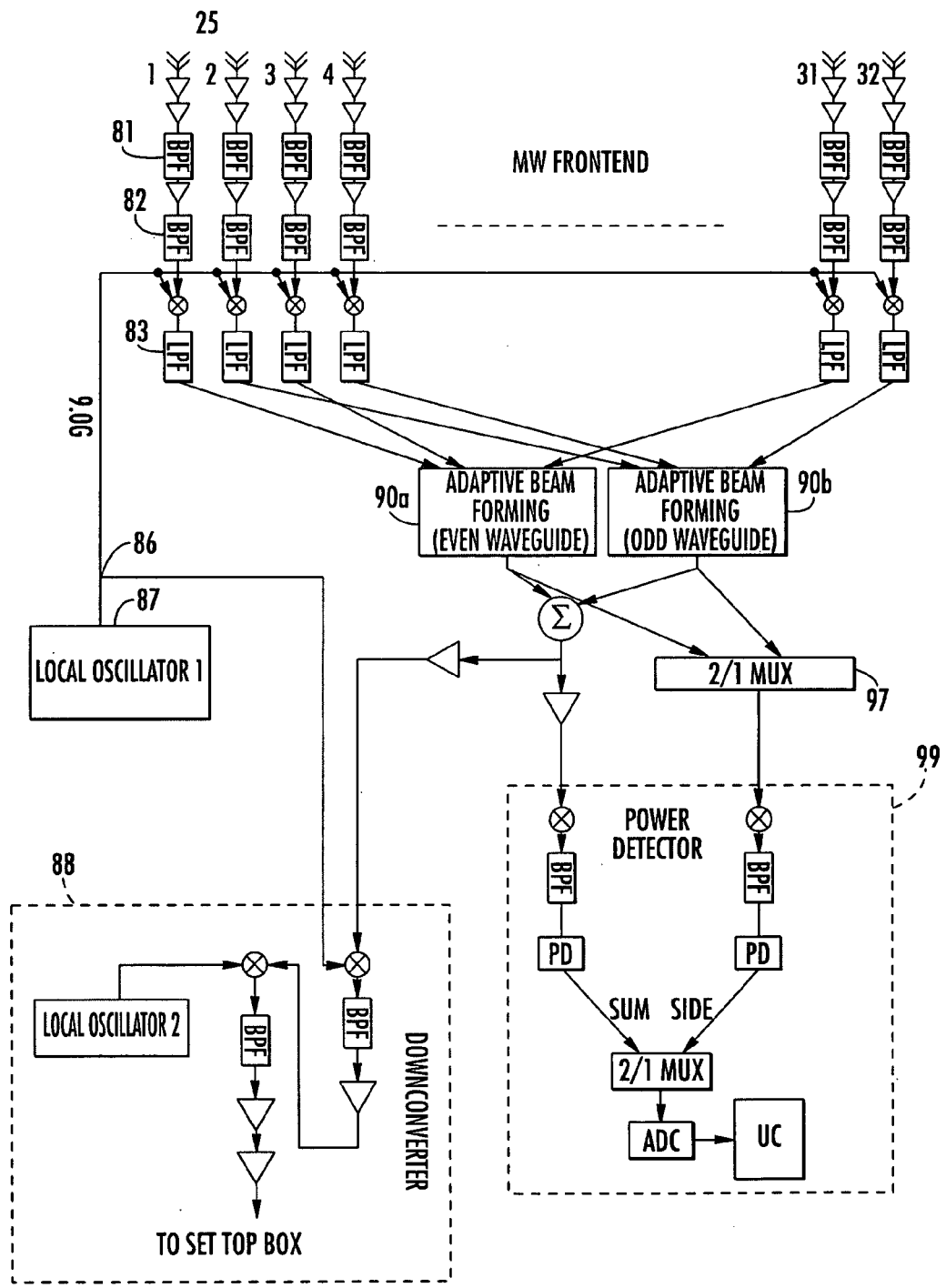
FIG. 8 is a schematic diagram of an embodiment of an adaptive beam-tracking system.

In another embodiment, in-motion antenna tracking can be used in antenna system 10. An adaptive beam forming processing as shown in FIG. 8 is employed in the in-motion antenna tracking system to automatically track the beam in elevation direction through the beam forming network. The adaptive beam forming processing is based on the principle of a correlating signal to derive a set of antenna weights to optimize the combined signal-to-noise ratio. By applying such operation to the output signal of each waveguide 14, a set of antenna weights can be generated to automatically optimize the output signal-to-noise ratio. This is equivalent to precisely pointing the antenna beam to the satellite direction. The (pre-detection) signal-to-noise ratio of the output of individual waveguide is typically quite low (close to 0 dB) to typical satellite signal applications. For example, the correlation is done by multiplying two signals and then integrating (or equivalently, low pass filtering of) the output of the multiplier. The time of integration (or the bandwidth of the integration) determines the post-detection signal-to-noise ratio. Integration time of 100 uS to 1 mS can bring the post-detection signal-to-noise ratio to more than 10 dB, thereby enabling accurately determination of the antenna weight used for combining. The adaptive beam forming processing can be based on the principle of Maximum Ratio Combining (MRC), Constant Modulus Algorithm (CMA), Multiple Signal Classifications (MUSIC), or various other principles to maximize the signal-to-noise ratio. Adaptive signal processing is applied to the elevation angle tracking for antenna system 10. In a two dimensional phased-array antenna, the adaptive signal processing technique can be applied to track the signal in both elevation and azimuth direction.

Figure 10:
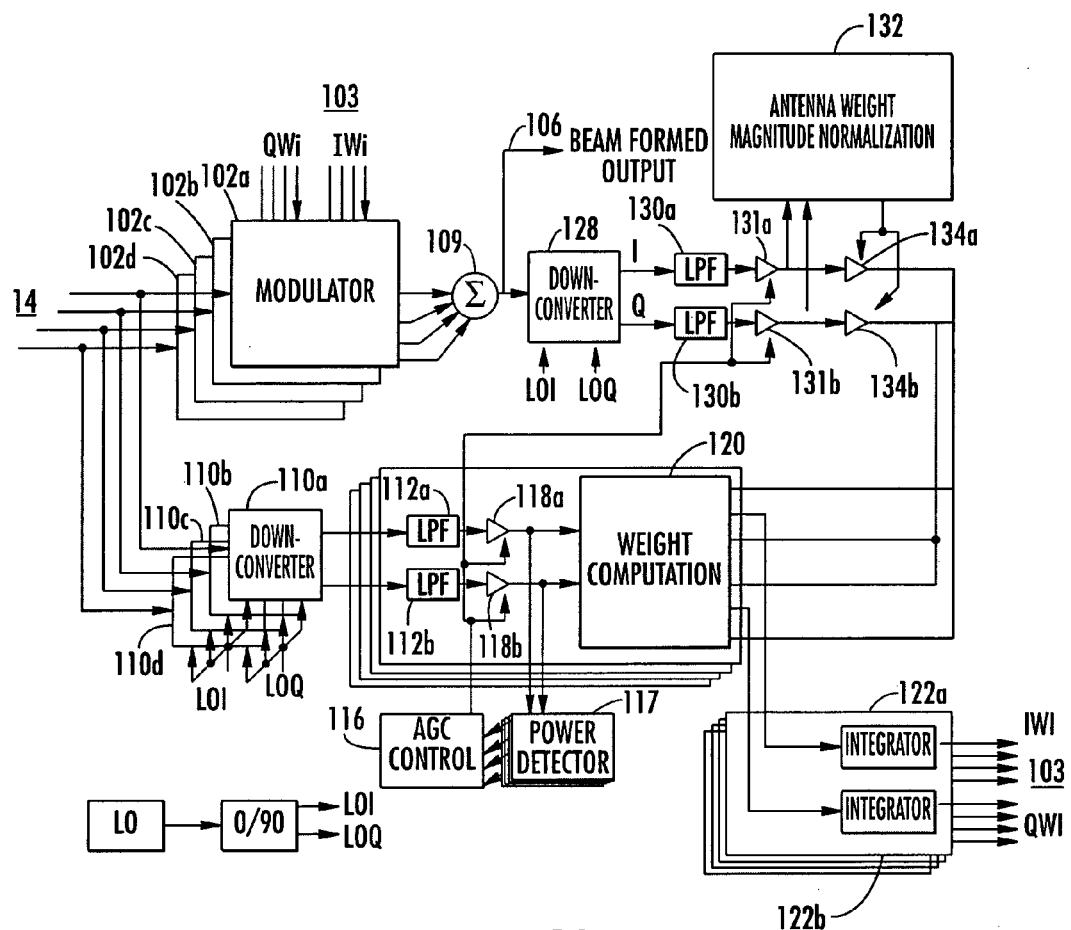
FIG. 10 is a schematic diagram of an embodiment of an adaptive beam forming system.

An embodiment of the adaptive beam tracking system 100 based on MRC is illustrated in FIG. 10. The signals from a plurality of waveguides 14, 40 are input into the beam forming processing. It will be appreciated that various numbers of antennas and processing elements could be used in accordance with the teachings of the present invention. Modulators 102*a–d* apply determined antenna weights 103 to the signal. Modulators 102*a–d* are controlled by the antenna weight to generate the desired phase shift and gain scaling for the signals. The outputs of modulators 102*a–d* are combined in summer 104 to generate combined (beam formed) output signal 106.

The antenna weight is computed by downconverting the input signals and the combined signal to baseband. In one embodiment, a direct down-conversion processing is employed in which the LO frequency is the same as the input signal frequency. The signal is thereby converted to the baseband. The output of the downconverter is first filtered to extract the signal in the desired frequency band. The signals from plurality of waveguides 14, 40 are downconverted in respective downconverters 110*a–d*. Each of downconverters 110*a–d* multiplies the signal from a different waveguide 14 by a local oscillator in-phase signal (LOI) and a local oscillator quadrature phase signal (LOQ). The resultant signals are applied to respective low-pass filters (LPF) 112*a*, 112*b* in a baseband automatic gain control (AGC) loop 116 that normalizes the signal level before the MRC algorithm. AGC loop 116 provides a consistent performance at different input signal levels. Variable gain amplifiers 118a, 118b are applied to the respective outputs of LPF 112a, 112b and MRC beamforming module 120. At the output of the variable gain amplifiers 118a, 118b, power detectors 117 are applied to sum the signal power of all antennas and compare the signal power to a threshold value. The difference between the signal power of all antennas and the threshold value can be integrated to maintain the signal level after AGC loop 116 at the same level and can be used to adjust the gain of variable gain amplifiers 118a, 118b. Accordingly, in this implementation, the MRC algorithm is able to work at different input signal levels.

MRC beamforming module 120 performs real time adaptive signal processing to obtain the maximum signal-to-noise ratio. In an implementation of MRC beamforming module 120 the antenna weights are used to align the phases of the four antenna signals received from waveguides 14 and also scale the signal in proportion to the square-root of the signal-to-noise ratio in each individual channel. In one implementation, the signal envelope is used as an approximation to scale the signal in proportion to the square-root of the signal-to-noise ratio in each individual channel.

MRC beamforming module 120 can employ a Cartesian feedback loop. MRC beamforming module 120 provides baseband processing which performs complex conjugate multiplication of the output of a baseband I and Q channel filter with a baseband reference I and Q channel as follows:

$$I\_ERROR_i = I_i * I_s + Q_i * Q_s$$

$$Q\_ERROR_i = I_i * Q_s - Q_i * I_s$$

The resultant signal ($I\_ERROR_1$, $Q\_ERROR_i$) at the output of MRC beamforming module 120 is a complex signal with phase equal to the difference of the reference complex signal and the individual signal and an envelope proportional to the envelope of the individual signal. Signal I_ERROR is applied to integrator 122a and signal Q_ERROR is applied to integrator 122b. The output of the LPFs 122a, 122b is antenna weight 103 (IWi, QWi, i=1,2,3, . . . ). The antenna weight normalization computes the summation of all the antenna weight and normalizes the summation to a constant through the use of the feedback operation.

Combined signal 106 is applied to downconverter 128 and is multiplied by LOI and LOQ. The resultant signals are applied to low-pass filters (LPF) 130a, 130b. The outputs from the low-pass filters (LPF) 130a, 130b are amplified with quadrature phase signal amplifiers 131a, 131b and applied to antenna weight magnitude normalization module 132.

Antenna weight magnitude control loop 132 monitors the power in the combined signal. If the magnitude of the weight is small, the power of the combined signal is small. Alternatively, if the magnitude of the weight is large, the power of the combined signal is large. A power detector can be used in the antenna weight magnitude control loop 132 to compare the power of combined signal 106 with a threshold level. The difference between the power of combined signal 106 and the threshold level is filtered such as with a low-pass filter (LPF). The filtered output can be fed forward to the variable gain amplifiers to adjust the magnitude of the combined signal. A higher gain in the variable gain amplifiers produces a larger antenna weight and a lower gain in the variable amplifiers produces a smaller antenna weight. By varying the gain of the variable gain amplifiers in the baseband SUM channel signal paths, the magnitude of the antenna weight is adjusted to a proper level to keep the output signal power in a small range.

Output from antenna weight magnitude normalizing module 132 is amplified with quadrature phase signal amplifiers 134a, 134b and is applied to MRC beamforming module 120 to be used for updating antenna weight 103, as described above.

An advantage of the adaptive beam forming processing of the present invention is a fast response and reliable tracking in the elevation beam. This is achieved via the processing on the phase of the signal directly instead of processing on the signal power as in the conventional elevation tracking system. Generally, the adaptive processing of the present invention achieves fast and reliable performance in a much lower signal-to-noise ratio. Additionally, the adaptive processing as illustrated in FIG. 10 is amendable to integrated circuit processing, thereby, reducing the overall cost of the system. Another advantage of present invention is that the overall tracking can be greatly simplified because the system now only needs to monitor the power of left and right beam and command the motor to move the antenna to track in azimuth direction. Accordingly, no motion sensors are used.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A satellite antenna system for mounting on a vehicle comprising;
    an antenna array to receive a satellite signal, said antenna array comprising a plurality of waveguides positioned parallel to one another for guiding received electromagnetic waves of said satellite signal,
    a radiating surface disposed adjacent to said waveguides;
    at least one radiating element emitting said electromagnetic waves, said at least one radiating elements being distributed along said radiating surface; and
    automatic in-motion beam forming tracking means for positioning said antenna array on a selected satellite while the vehicle is in motion.

2. The satellite antenna system of claim 1 wherein said automatic in-motion beam forming tracking means comprises means for detecting a left beam and a right beam to obtain information about antenna pivoting error in an azimuth direction.

3. The satellite antenna system of claim 2 wherein said left beam and said right beam are determined by varying spacing of said at least one radiating element.

4. The satellite antenna system of claim 3 wherein a wider said spacing between said radiating elements in odd ones of said waveguides or even ones of said waveguides is used for generating either said left beam or said right beam and a narrower said spacing between said radiating elements in the other of said odd ones of said waveguides or said even ones of said waveguides is used for generating the other of said left beam or said right beam.

5. The satellite antenna system of claim 1 wherein said automatic in-motion beam forming tracking means comprises means for detecting an up beam and a down beam to obtain information about antenna pointing error in an elevation direction.

6. The satellite antenna system of claim 5 wherein a first half of said waveguides are used for generating either said up beam or said down beam and a second half of said waveguides are used for generating the other of said up beams or said down beams.

7. The satellite antenna system of claim 6 wherein a degree of phase shift is used to generate said up beam or said down beam.

8. The satellite antenna system of claim 7 wherein said phase shift is about 90 degrees.

9. The satellite antenna system of claim 1 wherein said automatic in-motion tracking means comprises means for detecting a left beam and a right beam to obtain information about antenna pointing error in an azimuth direction and an up beam and a down beam to obtain information about antenna pointing error in an elevation direction.

10. The satellite antenna system of claim 9 wherein a sum beam is formed as a combination of said left beam, said right beam, said up beam and said down beam, signal powers of said left beam and said right beam are compared against each other and said sum beam to obtain said information of antenna pointing error in an azimuth direction and signal powers of said up beam and said down beam are compared against one another and said sum beam to obtain said information of antenna pointing error in an elevation direction.

11. The satellite antenna system of claim 10 wherein said antenna array is coupled to a platform and further comprising moving means for moving said platform said moving means using said pointing error in an azimuth direction for moving said platform in an azimuth direction and said pointing error in an elevation error for moving said platform in an elevation direction.

12. The satellite antenna system of claim 1 wherein said waveguides include a ridged portion extending from a bottom surface, said ridge portion positioned longitudinally between a pair of walls coupled to said bottom surface.

13. The satellite antenna system of claim 1 wherein each of said radiating elements is an X-shaped cross slot.

14. The satellite antenna system of claim 13 wherein a crossing angle of said X-shaped cross slot is other than about 90 degrees.

15. The satellite antenna system of claim 14 wherein said radiating elements are positioned about half a waveguide wavelength apart from one another.

16. The satellite antenna system of claim 14 wherein said radiating elements are positioned at an offset from a center of a waveguide axis of said waveguide toward one of said walls.

17. The satellite antenna system of claim 14 wherein said radiating elements are equally spaced apart.

18. The satellite antenna system of claim 14 wherein said ridge portion has a rectangular shape.

19. The satellite antenna system of claim 14 wherein said ridge portion has a square shape.

20. The satellite antenna system of claim 1 wherein said waveguides having a substantially inverted L-shape including a wall extending vertically downward from said radiating surface.

21. The satellite antenna system of claims 20 further comprising:
a ridged portion extending from said radiating surface at an opposite end from said wall.

22. The satellite antenna system of claims 21 wherein said ridge portion has a predetermined height and a predetermined width for determining depth of a groove between said ridge portion and said wall.

23. The satellite antenna system of claim 21 wherein said ridge portion has a rectangular shape.

24. The satellite antenna system of claim 21 wherein said ridge portion has a square shape.

25. The satellite antenna system of claim 21 wherein each of said radiating elements is an X-shaped cross slot.

26. The satellite antenna system of claim 20 wherein a crossing angle of said X-shaped cross slot is other than about 90 degrees.

27. The satellite antenna system of claim 20 wherein said radiating elements are positioned about half a waveguide wavelength apart from one another.

28. The satellite antenna system of claim 20 wherein said radiating elements are positioned at an offset from a center of said radiating surface of said waveguide toward one of said walls.

29. The satellite antenna system of claim 20 wherein said radiating elements are equally spaced apart.

30. The satellite antenna system of claim 1 wherein the satellite signal comprises a direct broadcast satellite signal.

31. A satellite antenna system comprising:
one or more satellite antennas to receive a satellite signal, and
adaptive beam forming means for determining from said satellite signal automatic in-motion positioning of said one or more satellite antennas, said adaptive beam forming means determines a set of antenna weights to optimize an output signal-to-noise ratio of an output signal from each of said one or more satellite antennas, said output signal from each of said one or more satellite antennas is correlated with a sum beam and a phase difference of said output signal from each of said one or more satellite antennas being adjusted to align the phases of said output signal from each of said one or more satellite antennas to said sum beam, the phase difference being used to adjust said antenna weight.

32. A satellite antenna system comprising:
one or more satellite antennas to receive a satellite signal,
adaptive beam forming means for determining from said satellite signal automatic in-motion positioning of said one or more satellite antennas, said one or more antennas comprise a waveguide,
a radiating surface disposed adjacent to said waveguide, and
at least one radiating element emitting said electromagnetic waves, said at least one radiating elements being distributed along said radiating surface,
wherein said adaptive beam forming means determines a set of antenna weights to optimize an output signal-to-noise ratio of an output signal from each of said waveguides.

33. The satellite antenna system of claim 32 wherein said weights are determined by Maximum Ratio Combining (MRC), Constant Modulus Algorithm (CMA), or Multiple Signal Classification (MUSIC).

34. The satellite antenna system of claim 32 wherein said weights are determined by maximal ratio combining (MRC) to align phases of said output signal from each of said waveguides to the same phase and to scale said output signal from each of said waveguides in proportion to a square root of a received signal-to-noise ratio.

35. The satellite antenna system of claim 32 wherein said weights are determined by:
means for determining a complex error signal by a complex conjugate multiplication of each of said input signals and a reference complex signal; and
means for low pass filtering said error signal to determine said antenna weights.

36. The satellite antenna system of claim 34 further comprising:
means for maintaining a magnitude of said weights.

37. The satellite antenna system of claim 34 wherein said weights are applied to a respective one at said output signal from each of said waveguides using a modulator.

38. The satellite antenna system of claim 34 wherein the satellite signal comprises a direct broadcast satellite signal.

39. A method for automatic in-motion tracking comprising the steps of:
receiving a satellite signal at an antenna array comprising a plurality of waveguides;
detecting a left beam and a right beam from said satellite signal to obtain information about antenna pointing error in an azimuth direction; and
detecting an up beam and a down beam from said satellite signal to obtain information about antenna pointing error in an elevation direction wherein said sum beam is formed as a combination of said left beam, said right beam, said up beam and said down beam comprising the steps of:
comparing signal powers of said left beam and said right beam against each other and said sum beam to obtain said information of antenna pointing error in an azimuth direction and comparing signal powers of said up beam and said down beam are compared against one another and said sum beam to obtain said information of antenna pointing error in an elevation direction.

40. A method for automatic in-motion tracking comprising the steps of:
receiving a satellite signal at an antenna array comprising a plurality of waveguides;
detecting a left beam and a right beam from said satellite signal to obtain information about antenna pointing error in an azimuth direction; and
detecting an up beam and a down beam from said satellite signal to obtain information about antenna pointing error in an elevation direction wherein said antenna array is coupled to a platform and further comprising moving the steps of:
said platform using said pointing error in an azimuth direction for moving said platform in an azimuth direction and said pointing error in an elevation error for moving said platform in an elevation direction.

41. The method for automatic in-motion tracking comprising the step of:
receiving a satellite signal at one or more antennas;
adaptive beam forming for detecting from said satellite signal automatic in-motion positioning of one or more satellite antennas wherein said one or more antennas comprise a waveguide,
a radiating surface disposed adjacent to said waveguide,
at least one radiating element emitting said electromagnetic waves, said at least one radiating elements being distributed along said radiating surface wherein said adaptive beam forming determines a set of antenna weights to optimize an output signal-to-noise ratio of an output signal from each of said waveguides.

42. The method of claim 41 wherein said weights are determined by Maximum Ratio Combining (MRC), Constant Modulus Algorithm (CMA), or Multiple Signal Classification (MUSIC).

43. The method of claim 42 wherein said weights are determined by maximal ratio combining (MRC) to align phases of said output signal from each of said waveguides to the same phase and to scale said output signal from each of said waveguides in proportion to a square root of a received signal-to-noise ratio.

44. The method of claim 43 wherein said weights are determined by the steps of:
determining a complex error signal by a complex conjugate multiplication of each of said input signals and a reference complex signal; and
low pass filtering said error signal to determine said antenna weights.

45. The method of claim 43 further comprising the step of:
maintaining a magnitude of said weights.

46. The method of claim 43 wherein said weights are applied to a respective one at said output signal from each of said waveguides using a modulator.

47. The method of claim 41 wherein the satellite signal comprises a direct broadcast satellite signal.

* * * * *